Feb. 18, 1958     C. D. WILSON     2,824,203

ELECTRICAL HEATING UNIT AND MEANS FOR HOLDING THE SAME

Filed May 9, 1955

Witness
A. G. Martin

INVENTOR.
C. D. Wilson
BY
Talbert Dick & Adler
Attorneys

United States Patent Office 2,824,203
Patented Feb. 18, 1958

2,824,203

ELECTRICAL HEATING UNIT AND MEANS FOR HOLDING THE SAME

Clifford D. Wilson, Conrad, Iowa

Application May 9, 1955, Serial No. 506,940

4 Claims. (Cl. 219—37)

This invention relates to a detachable electrical heating unit and more particularly to one that is of the tube sealed type and means for holding the same to a surface to be heated.

The use of metal tube encased electricity resistant means for producing electrical heat is well known. It also is known that the closer the heating unit is to the surface to be heated, the more efficient will be the heating result. In the case of vessels, tanks and like holding fluid to be heated, the usual method is to use clamp brackets to hold the heating rod or coil to the bottom of the same. While such means do support the heating unit they are not especially effective in maintaining a press contact between the unit and bottom of the tank or like. Also such clamps use threaded holding screws, bolts and like. Obviously, such threaded means become rusted and are most difficult to remove when it is necessary to replace a burned out unit with a new one. Furthermore, in many installations it is almost impossible to reach or get at the threaded members that must be removed to remove and replace parts.

Therefore, one of the principal objects of my invention is to provide an electrical heating unit holding means that has no movable parts.

A further object of this invention is to provide a means for holding an electrical heating unit that permits the instant release of the unit from the surface of an object to be heated.

A still further object of my invention is to provide a metal tubular heating unit holder that maintains contact between the tube and object to be heated at all times.

A still further object of this invention is to provide a heat unit support that requires a minimum of space.

A still further object of my invention is to provide a heating unit support means that yieldingly holds the unit into continuous uniform contact with the surface to be heated.

Still further objects of my invention are to provide an electrically heated unit holding means that is economical in manufacture, durable in use, and refined in appearance.

These and other objects will be apparent to those skilled in the art.

My invention consists in the construction, arrangements, and combination of the various parts of the device, whereby the objects contemplated are attained as hereinafter more fully set forth, specifically pointed out in my claims, and illustrated in the accompanying drawings, in which:

Figure 2:
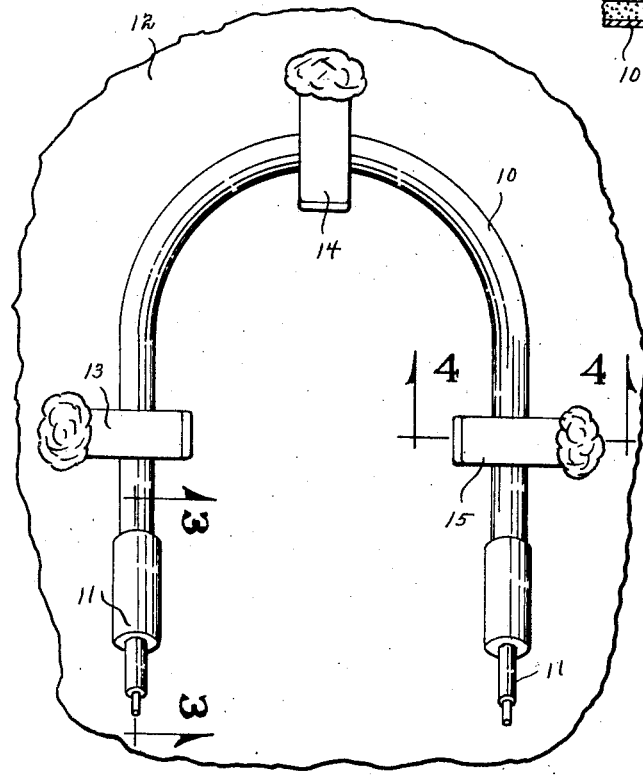
Fig. 2 is a bottom view of an electrically heated tube unit being secured to the bottom of a container by my detachable method.

In these drawings I have bent an ordinary tubular heat unit or rod into a U-shaped tubular member 10, as shown in Fig. 2. Such electrical heat rods are cased with a metal having a certain amount of spring resiliency, and in this structure the two ends of the unit tend to spring away from each other. This resiliency against the compressing of the two end portions toward each other is an important factor of this invention. At each end of the U-rod 10 is the usual connector end portion 11, designed to be imposed in an electric circuit, which in turn is in communication with a source of electrical energy.

Figure 1:
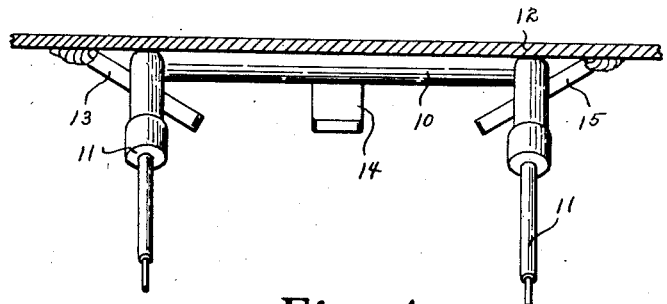
Fig. 1 is a back view of my unit and means for supporting the same.
Figure 3:
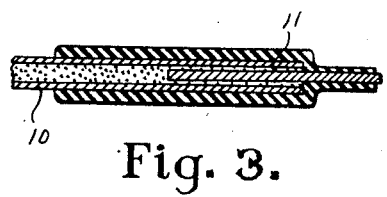
Fig. 3 is an enlarged longitudinal view of one end of an ordinary electrical heat unit and is taken on line 3—3 of Fig. 2.
Figure 4:
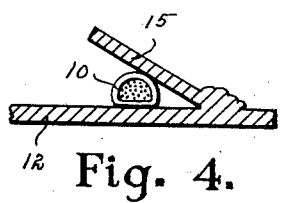
Fig. 4 is a cross sectional view of a portion of the device taken on line 4—4 of Fig. 2 and more fully illustrates its construction.

The numeral 12 designates the bottom of a container, plate tank, vessel, tub, trough, kettle, pan or like. On this bottom I secure three bar fingers 13, 14 and 15, as shown in Fig. 2. These bar fingers each extend downwardly at an angle from the bottom 12. The two fingers 13 and 15 are spaced apart and extend downwardly and toward each other. The finger 14 is positioned forward of and centered to the two fingers 13 and 15. This finger 14 extends downwardly and toward an imaginary line drawn between the two fingers 13 and 15. Any suitable means may be used to secure the upper end of each of these fingers to the bottom 12, such as welding, solder, rivets, or like. When these fingers are installed, as shown in Fig. 1, they provide a cluster pocket for the reception of my U-formed electrical heating rod unit. The unit rod 10 is manually grasped, its two ends forced toward each other and then slid into the receiving space between the bottom 12 and the angularly extending fingers. The central area of the unit will engage under the finger 14 and the two end portions of the unit will engage under the two fingers 13 and 15, respectively, as shown in Fig. 2. Merely by releasing pressure on the ends of the unit, it will expand under the fingers and due to the fact that they extend at an angle to the bottom 12, this expansion will yieldingly force the unit into continuing yielding intimate contact with the bottom of the container or plate 12. Thus the spring tension of the unit itself will maintain constant uniform contact. Also the removal of the unit is as quick and easy as its installation. All that is necessary is to compress the two end portions of the unit and slide it rearwardly from contact with the fingers 13, 14 and 15. These fingers also are tightly contacted by the unit, and inasmuch as they are directly secured to the bottom 12, they absorb some heat from the outer side of the unit and transfer the same to the member 12. If desired the rod 10 may have its face adjacent the bottom 12, flattened as shown in Fig. 4, for even more surface contact with the bottom 12.

While I have described the tube 10 as one holding an electricity resistance means, my invention may be used also for holding a fluid or water U-pipe to a surface.

Some changes may be made in the construction and arrangement of my electrical heating unit and means for holding the same without departing from the real spirit and purpose of my invention, and it is my intention to cover by my claims, any modified forms of structure or use of mechanical equivalents which may be reasonably included within their scope.

I claim:

1. In a device of the class described, a base having a surface, two spaced apart bar fingers extending from said base at an angle and toward each other, a circular U-shaped tubular heating unit having two non-connected free ends and having spring characteristics detachably resting between said surface of said base and said angularly extending bar fingers; said circular U-shaped tubular heating unit having its two free ends compressible toward each other for removal from or placement under said bar fingers, and a flexible electrical lead wire extending from each free end of said U-shaped tubular heating unit.

2. In a device of the class described, a base having a surface, two spaced apart bar fingers extending from said base at an angle and toward each other, a circular U-shaped tubular heating unit having two non-connected free ends and having spring characteristics detachably resting between said surface of said base and said angularly extending bar fingers; said circular U-shaped tubular heating unit having a flat surface adjacent the surface of said base and having its two free ends compressible toward each other for removal from or placement under said bar fingers, and a flexible electrical lead wire extending from each free end of said U-shaped tubular heating unit.

3. In a device of the class described, a base having a surface, two spaced apart bar fingers extending from said base at an angle and toward each other, a third bar finger extending from said base and forward of the plane between said first two bar fingers, a circular U-shaped tubular heating unit having two non-connected free ends and having spring characteristics detachably resting between said surface of said base and said angularly extending bar fingers; said circular U-shaped tubular heating unit having its two free ends compressible toward each other for removal from or placement under said bar fingers, and a flexible electrical lead wire extending from each free end of said U-shaped tubular heating unit.

4. In a device of the class described, a base having a surface, two spaced apart bar fingers extending from said base at an angle and toward each other, a third bar finger extending rearwardly at an angle from said base and forward of the plane between said first two bar fingers, a circular U-shaped tubular heating unit having two non-connected free ends and having spring characteristics detachably resting between said surface of said base and said angularly extending bar fingers; said circular U-shaped tubular heating unit having its two free ends compressible toward each other for removal from or placement under said bar fingers, and an electrical lead wire extending from each free end of said U-shaped tubular heating unit.

References Cited in the file of this patent

UNITED STATES PATENTS

| | | |
|---|---|---|
| 1,092,526 | Hassel et al. | Apr. 7, 1914 |
| 1,848,337 | Franzen | Mar. 8, 1932 |

FOREIGN PATENTS

| | | |
|---|---|---|
| 221,009 | Switzerland | Aug. 1, 1942 |
| 819,879 | Germany | Nov. 5, 1951 |